United States Patent [19]
Bloom

[11] Patent Number: 5,948,134
[45] Date of Patent: *Sep. 7, 1999

[54] APPARATUS FOR FORMING A FIBER OPTIC COUPLER BY DYNAMICALLY ADJUSTING PULLING SPEED AND HEAT INTENSITY

[76] Inventor: Cary Bloom, 251 Blaze Climber Way, Rockville, Md. 20850

[ * ] Notice: This patent issued on a continued prosecution application filed under 37 CFR 1.53(d), and is subject to the twenty year patent term provisions of 35 U.S.C. 154(a)(2).

[21] Appl. No.: 08/906,083

[22] Filed: Aug. 5, 1997

Related U.S. Application Data

[62] Division of application No. 08/718,727, Sep. 24, 1996, abandoned.

[51] Int. Cl.$^6$ .................................................. C03B 37/07
[52] U.S. Cl. .................................. 65/376; 65/381; 65/411
[58] Field of Search ............................... 65/411, 381, 378

[56] References Cited

U.S. PATENT DOCUMENTS

| | | |
|---|---|---|
| Re. 33,296 | 8/1990 | Stowe et al. . |
| Re. 34,955 | 5/1995 | Anton et al. . |
| 3,854,003 | 12/1974 | Duret . |
| 4,026,632 | 5/1977 | Hill et al. . |
| 4,597,338 | 7/1986 | Thorncraft et al. . |
| 4,611,894 | 9/1986 | Roberts . |
| 4,699,453 | 10/1987 | Roberts . |
| 4,701,010 | 10/1987 | Roberts . |
| 4,714,316 | 12/1987 | Moore et al. . |
| 4,763,977 | 8/1988 | Kawasaki et al. . |
| 4,772,085 | 9/1988 | Moore et al. . |
| 4,779,945 | 10/1988 | Hill et al. . |
| 4,792,203 | 12/1988 | Nelson et al. . |
| 4,798,438 | 1/1989 | Moore et al. . |
| 4,834,481 | 5/1989 | Lawson et al. . |
| 4,895,423 | 1/1990 | Bilodeau et al. . |

(List continued on next page.)

FOREIGN PATENT DOCUMENTS

| | | |
|---|---|---|
| 0215668A2 | 9/1986 | European Pat. Off. . |
| 0293289 | 5/1988 | European Pat. Off. . |
| 2235043 | 8/1990 | United Kingdom . |
| WO87/00934 | 7/1986 | WIPO . |

OTHER PUBLICATIONS

"Automated Fabrication of Fused Fibre Optic Couplers" by Robert Frank Swain, dissertation, Heriot–Watt University, Edinburgh, Ireland (1993).

"Tapered Optical Fiber Components and Sensors", by L.C. Bobb, et al., Microwave Journal, May 1992.

"The Shape of Fiber Tapers", by T.A. Birks et al., Journal of Lightwave Technology, IEEE, vol. 10, No. 4, Apr. 1992, pp. 432–438.

"Mass Production of Fused Couplers and Coupler Based Devices", by W.E. Moore et al.

(List continued on next page.)

*Primary Examiner*—John Hoffmann
*Attorney, Agent, or Firm*—Irah H. Donner, Pepper Hamilton LLP

[57] ABSTRACT

Fused biconical tapered couplers formed from the pulling of heated optical fibers have controllable coupling ratios by dynamically adjusting the heat intensity and pull speed during fabrication. Fiber coupler fabrication begins by arranging two optical fibers, heating the optical fibers using a heat source a predetermined distance from the optical fibers, and pulling the optical fibers at an initial pulling velocity as the heated optical fibers soften. The heat source is moved away from the optical fibers and the pulling velocity is selectively reduced in response to a substantial change in the detected coupling ratio. Changes in the coupling ratio are controlled by selectively reducing the pulling speed and the heat intensity to a point where the pulling of the optical fibers may be halted, and the heat removed, without a substantial change in the detected coupling ratio. The coupling ratio may be monitored at different wavelengths for fabrication of wideband couplers and wavelength division multiplexers.

10 Claims, 8 Drawing Sheets

U.S. PATENT DOCUMENTS

| | | |
|---|---|---|
| 4,900,119 | 2/1990 | Hill et al. . |
| 4,906,068 | 3/1990 | Olson et al. . |
| 4,923,273 | 5/1990 | Taylor . |
| 4,995,688 | 2/1991 | Anton et al. . |
| 4,997,243 | 3/1991 | Aiki et al. . |
| 4,997,245 | 3/1991 | DuPuy et al. . |
| 4,997,247 | 3/1991 | Stowe . |
| 4,997,248 | 3/1991 | Stowe . |
| 4,997,252 | 3/1991 | Sugawara et al. . |
| 4,997,253 | 3/1991 | Enochs . |
| 5,009,478 | 4/1991 | Sasaki et al. . |
| 5,013,117 | 5/1991 | Fukuma . |
| 5,013,121 | 5/1991 | Anton et al. . |
| 5,028,110 | 7/1991 | Plummer . |
| 5,031,994 | 7/1991 | Emmons . |
| 5,037,176 | 8/1991 | Roberts et al. . |
| 5,066,149 | 11/1991 | Wheeler et al. . |
| 5,067,678 | 11/1991 | Henneberger et al. . |
| 5,093,885 | 3/1992 | Anton . |
| 5,121,453 | 6/1992 | Orazi et al. . |
| 5,123,219 | 6/1992 | Beard et al. . |
| 5,136,121 | 8/1992 | Kluska et al. . |
| 5,157,751 | 10/1992 | Maas et al. . |
| 5,159,655 | 10/1992 | Ziebol . |
| 5,166,992 | 11/1992 | Cassidy et al. . |
| 5,166,994 | 11/1992 | Stowe et al. . |
| 5,176,730 | 1/1993 | Suganuma ................................. 65/4.2 |
| 5,179,608 | 1/1993 | Ziebol et al. . |
| 5,179,618 | 1/1993 | Anton . |
| 5,189,723 | 2/1993 | Johnson et al. . |
| 5,208,894 | 5/1993 | Johnson et al. . |
| 5,214,732 | 5/1993 | Beard et al. . |
| 5,214,735 | 5/1993 | Henneberger et al. . |
| 5,222,176 | 6/1993 | Webber et al. . |
| 5,239,604 | 8/1993 | Ziebol et al. . |
| 5,251,002 | 10/1993 | Gryk . |
| 5,261,019 | 11/1993 | Beard et al. . |
| 5,274,731 | 12/1993 | White . |
| 5,283,852 | 2/1994 | Gibler et al. . |
| 5,288,301 | 2/1994 | Rowe et al. . |
| 5,293,440 | 3/1994 | Miles et al. . |
| 5,293,582 | 3/1994 | Beard et al. . |
| 5,305,405 | 4/1994 | Emmons et al. . |
| 5,316,243 | 5/1994 | Henneberger . |
| 5,317,663 | 5/1994 | Beard et al. . |
| 5,318,610 | 6/1994 | Takimoto et al. . |
| 5,319,728 | 6/1994 | Lu et al. . |
| 5,319,733 | 6/1994 | Emmons et al. . |
| 5,329,600 | 7/1994 | Sasaoka et al. . |
| 5,343,544 | 8/1994 | Boyd et al. . |
| 5,355,426 | 10/1994 | Daniel et al. . |
| 5,363,465 | 11/1994 | Korkowski et al. . |
| 5,367,591 | 11/1994 | Seike et al. . |
| 5,381,497 | 1/1995 | Toland et al. . |
| 5,386,484 | 1/1995 | Ooka et al. . |
| 5,386,488 | 1/1995 | Oikawa . |
| 5,386,490 | 1/1995 | Pan et al. . |
| 5,395,101 | 3/1995 | Takimoto et al. . |
| 5,420,949 | 5/1995 | Arima et al. . |
| 5,422,969 | 6/1995 | Eno . |
| 5,432,875 | 7/1995 | Korkowski et al. . |
| 5,445,319 | 8/1995 | Pan et al. . |
| 5,459,598 | 10/1995 | Carrington . |
| 5,463,704 | 10/1995 | Ziebol . |
| 5,475,780 | 12/1995 | Mizrahi . |
| 5,475,782 | 12/1995 | Ziebol . |
| 5,475,784 | 12/1995 | Bookbinder et al. . |
| 5,496,340 | 3/1996 | Arima ....................................... 65/378 |
| 5,496,390 | 3/1996 | Arima et al. . |
| 5,497,444 | 3/1996 | Wheeler . |
| 5,577,149 | 11/1996 | Averbeck et al. . |
| 5,588,087 | 12/1996 | Emmons et al. . |
| 5,602,952 | 2/1997 | Rashleigh et al. . |
| 5,620,494 | 4/1997 | Sasaoka ................................... 65/377 |

OTHER PUBLICATIONS

"Loss and Spectral Control in Fused Tapered Couplers", by K. P.Oakley et al., Optical Engineering, vol. 33, No. 12, Dec. 1994, pp. 4006–4019.

"Control of Optical Fibre Taper Shape", Electronics Letters, vol. 27, No. 18, Aug. 29, 1991.

APPARATUS FOR FORMING A FIBER OPTIC COUPLER BY DYNAMICALLY ADJUSTING PULLING SPEED AND HEAT INTENSITY

This application is a division of application Ser. No. 08/718,727 filed Sep. 24, 1996 now abandoned.

FIELD OF THE INVENTION

The present invention relates to an arrangement for forming a fiber optic device, for example, fused biconical tapered couplers.

DESCRIPTION OF THE RELATED ART

Fiber optic couplers are used as optical beam splitters between two or more fibers, and are used in different optical systems, such as optical communications. Fused biconical tapered couplers are formed generally by placing two bare single mode fibers in contact with each other, adding tension to the fibers, and heating the fibers using a heat source, for example a flame. As the fibers soften, they fuse together to form the fused biconical tapered coupler. The fused biconical tapered coupler may also be used as a wavelength division multiplexer, where optical radiation at two or more wavelengths are combined through the coupler.

Considerable effort has been undertaken to control the optical performance of the fused biconical tapered coupler during manufacture. However, several variations during the heating process adversely affect the final characteristics of the coupler. FIG. 1A is a diagram illustrating the coupling ratio 10 and 12 of an optical fiber at the respective wavelengths of 1550 nm and 1310 nm as the optical fibers are pulled during the fabrication process. As shown in FIG. 1A, the process begins at the pull distance of 0 mm. The coupling ratio is 0% at 0 mm, indicating that all optical radiation transmitted from one optical fiber is received at the other end of that same optical fiber. Hence, there is no coupling of optical energy into the second optical fiber. At point 10a, the optical radiation at 1550 nm has a 50% coupling ratio, where half of the transmitted power is transmitted to each of the optical fibers. At point 10b, the coupling ratio is 100%, where all of the transmitted power is coupled to the second optical fiber. After reaching the maximum coupling ratio at 10b, the coupling ratio for the optical energy at 1550 nm returns toward 50% at point 10c. As shown in FIG. 1A, the coupling ratio continues to oscillate between 0 and 100% as the optical fibers are pulled.

Similarly, as the optical fibers are heated and pulled, the coupling ratio 12 for 1310 nm increases to a point 12a intersecting with the coupling ratio 10 of the first wavelength. The coupling ratio 12 continues to increase to a maximum level of 100% at point 12b, and then continues to oscillate in its values as the optical fibers are pulled further.

As shown in FIG. 1A, it is desirable in the formation of a wideband coupler to halt the change in coupling ratios such that the fiber optic coupler has a stable coupling ratio corresponding to the points 10c and 12a. However, the coupling ratio in FIG. 1A is generated by heating and pulling the optical fibers using a constant temperature and draw speed (i.e., pull speed). If during the pull process the heat source is suddenly removed, the value of the coupling ratio may jump from 1% to 10%, preventing an operator from precisely setting the coupling ratio. Specifically, as shown in FIG. 1B, the coupling ratio 14 at a selected wavelength increases as the optical fibers are pulled a certain distance. Assuming that a 50% optical fiber coupler is to be manufactured, the sudden removal of the heat source at the 50% point would actually cause the coupling ratio to jump to point 16, which may have a coupling ratio value of 75%. Constant heating of the optical fibers creates a heated atmosphere around the coupler having a different index of refraction than cool air. In addition, the heated optical fibers may have a different index of refraction than cooled optical fibers. Hence, sudden removal of the flame causes a substantial change in the atmospheric index of refraction and a temperature change in the optical fiber.

Hence, active monitoring of the coupling ratio during drawing results in inaccurate readings. If a technician desires to manufacture a 50% coupler, the technician will typically remove the flame at an earlier detection level, such as 25% or 30%, in an effort to anticipate the jump in the coupling ratio. However, such efforts in anticipating the jump in the coupling ratio is determined by trial and error. Variables such as room temperature, flame temperature, humidity, core and cladding thickness, etc., also affect the coupling ratio, and attempts to remove the flame at an earlier detection level may result in a jump in the coupling ratio to the point 18, which may be outside the specification range for the fiber optic coupler.

Hence, fabrication of a fiber optic coupler is heavily dependent upon experience of an operator in subjectively estimating the point at which the heat source should be removed in order to anticipate the jump in the coupling ratio. The known coupler fabrication techniques are thus inherently unreliable, and do not provide a repeatable system for forming an optical fiber coupler having a desired coupling ratio.

DISCLOSURE OF THE INVENTION

There is a need for an arrangement for consistently forming a fiber optic coupler having a desired coupling ratio for a selected wavelength.

There is also a need for an arrangement for forming a fiber optic coupler, where changes in the coupling ratio during coupler formation can be consistently controlled.

There is also a need for an arrangement for forming a fiber optic coupler that selectively changes the rate of change in a detected coupling ratio during formation of the coupler.

These and other needs are attained by the present invention, where the pulling speed and heat intensity are dynamically controlled in accordance with the detected coupling ratio to control the rate of change in the coupling ratio.

According to one aspect of the present invention, a method of forming a fiber optic device from first and second optical fibers contacting each other at a fusion region includes the steps of applying incident heat on the first and second optical fibers at the fusion region with a heat source positioned at a predetermined distance from the optical fibers, pulling the heated first and second optical fibers at a pulling velocity, reducing the incident heat on the first and second optical fibers at a first reduction rate in response to a change in a detected coupling ratio between the first and second optical fibers, adjusting the pulling velocity by a first acceleration rate in response to the change in the detected coupling ratio, and repeating the reducing and adjusting steps in accordance with the detected coupling ratio. Changing the incident heat and the pulling velocity of the optical fibers in accordance with the detected coupling ratio maintains control over the change in the detected coupling ratio. Hence, the incident heat and the pulling velocity may be adjusted to a point that subsequent changes to the incident heat or pulling velocity have little or no effect on the final coupling ratio, resulting in a system that maintains control over the final coupling ratio of the formed fiber optic coupler.

According to another aspect of the present invention, a method of forming a fiber optic coupler from first and second optical fibers contacting each other at a fusion region comprises the steps of applying incident heat on the first and second optical fibers at the fusion region with a heat source positioned a predetermined distance from the optical fibers, pulling the heated first and second optical fibers at a first velocity, reducing the incident heat on the first and second optical fibers at a first reduction rate in response to a change in a detected coupling ratio between the first and second optical fibers, adjusting the first velocity by a first acceleration rate in response to the change in the detected coupling ratio, and selectively changing at least one of the first reduction rate and the first acceleration rate in accordance with the detected coupling ratio. Selectively changing the first reduction rate and/or the first acceleration rate ensures control over the coupling ratio and the rate of change of the coupling ratio during formation of the optical fiber coupler. Hence, if the coupling ratio is changing at an undesired rate, the first reduction rate and/or first acceleration rate may be changed to provide a more desirable rate of change in the detected coupling ratio. Hence, the manufacture of fiber optic couplers can be precisely controlled to form couplers having accurate coupling ratios.

Still another aspect of the present invention provides an apparatus for fusing first and second optical fibers each having a first end secured, the apparatus comprising at least one actuator pulling a second end of the first and second optical fibers at a pulling velocity, at least one detector calculating a coupling ratio between the first and second optical fibers in response to detected optical energy output at an end of at least one of the optical fibers, a heat source applying heat to the first and second optical fibers at a selected intensity, and a controller controlling the pulling velocity and the heat intensity, the controller successively reducing the pulling velocity and the heat intensity at the respective first and second reduction rates in accordance with the detected coupling ratio. Hence, the apparatus of the present invention dynamically adjusts the pulling velocity and heat intensity to maintain control over the detected coupling ratio. Hence, the present invention enables formation of a fiber optic coupler having a desired coupling ratio with consistent results.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed arrangement for forming a fiber optic coupler maintains control of the coupling ratio by maintaining constant control of the heat intensity applied to the optical fibers, and the pull speed during the pulling of the optical fibers. Fiber coupler fabrication begins by arranging two optical fibers contacting each other within a fusion region, heating the optical fibers, and pulling the optical fibers as the heated optical fibers soften. Once a substantial change in the detected coupling ratio is identified, the heating intensity and the pulling velocity are selectively reduced to maintain an accurate reading of the coupling ratio during formation of the optical coupler. Hence, maintaining control of the coupling ratio by selectively reducing the pulling speed and the heat intensity ensures an accurate reading of the coupling ratio without an overshoot of the measured coupling ratio when the heating element is removed.

As described below, the incident heat and the pull velocity are reduced in response to preferably a substantial change in the detected coupling ratio. The substantial change in the detected coupling ratio is defined as the point during the fusion process at which the two optical fibers begin fusing, resulting in a coupling ratio change from 0% (i.e., all optical power energy in one optical fiber) to 3%–5%. When the detected coupling ratio is in the range of 3% and 5%, the optical fibers are physically fused, but are just beginning to optically couple transmitted optical energy. This point is referred to as the initial coupling point.

The incident heat on the first and second optical fibers may be reduced after the initial coupling point in view of the realization that a larger amount of heat is unnecessary to pull the optical fibers. Specifically, optical fibers are typically formed of fused quartz. Fused quartz is a poor conductor of heat, and does not quickly dissipate heat. Hence, a relatively large amount of heat is initially required to soften the fibers sufficiently to cause physical fusion. However, the softened fibers tend to retain the heat during pulling. Consequently, once the optical fibers have been heated to the initial coupling point, the heat may be subsequently reduced to the minimal amount necessary to pull the optical fibers. As the heat source intensity is reduced, the pull speed may also be reduced to reduce the rate of change in the coupling ratio. The change in heat intensity itself does not change the coupling ratio per se. Rather, changes in the heat source intensity and the pull speed may affect the shape of the taper being formed. Further, the shape of the taper determines the characteristics of the coupling ratio. Hence, the gradual reduction in heat intensity and pull speed enables the pulling process to be halted and the flame removed when the desired coupling ratio has been reached, without a sudden change in the measured coupling ratio.

Figure 2:
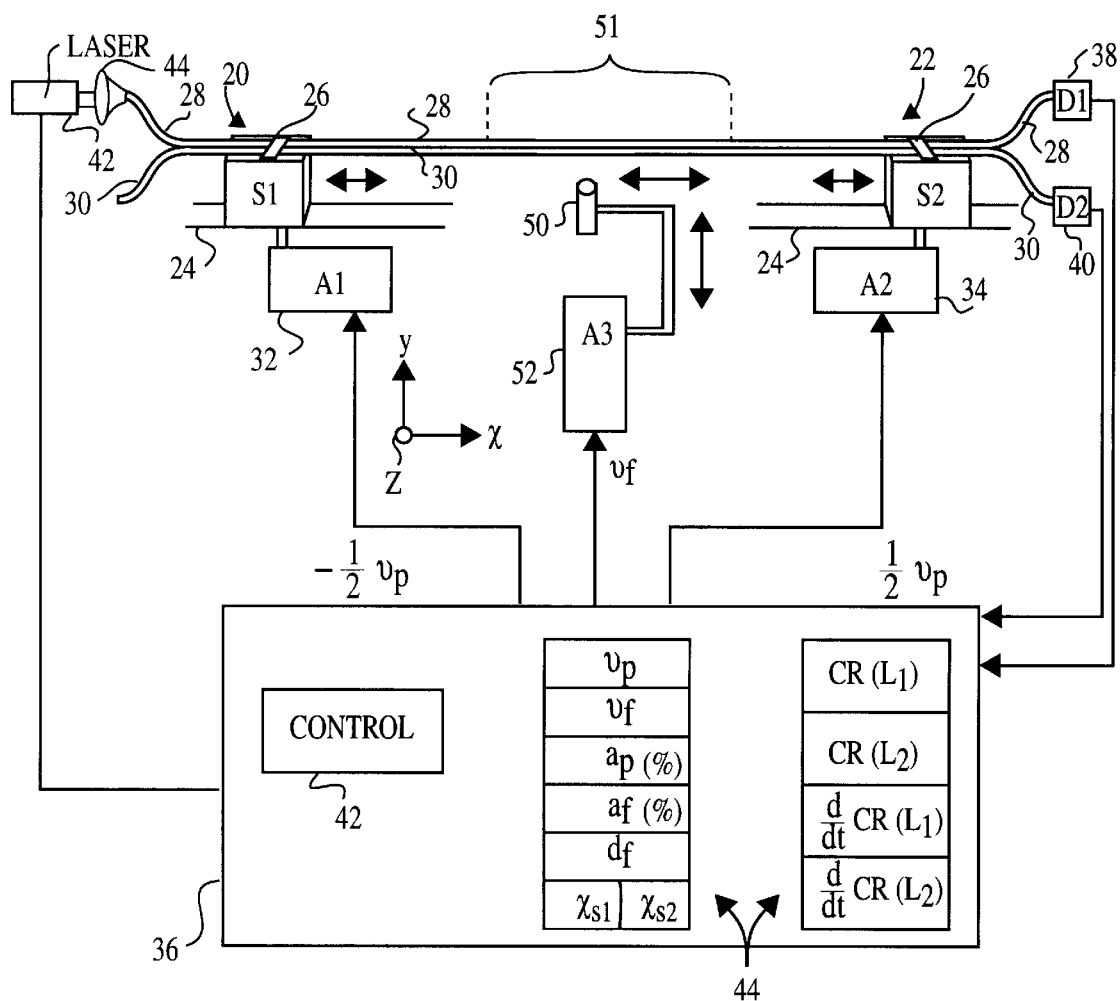
FIG. 2 is a block diagram of an apparatus for fusing first and second optical fibers to form a fiber optic coupler according to an embodiment of the present invention.

FIG. 2 is a block diagram of an apparatus for fusing optical fibers according to an embodiment of the present invention. As shown on FIG. 2, the apparatus includes stages 20 and 22 that are movable along rails 24 in an axis x parallel to the length of the optical fibers 28 and 30. Each stage 20 and 22 includes a mount 26 that secures optical fibers 28 and 30 to the corresponding stage. The position of the stages 20 and 22 are controlled by actuators 32 and 34, respectively. Each of the actuators 32 and 34 include stepper motors providing high resolution in the translational movement of the stages 20 and 22.

The actuators 32 and 34 each pull the optical fibers in opposite directions at a pull speed ($1/2v_p$) in response to control signals output from a controller 36. Hence, the overall pull speed of the optical fibers equals $v_p$. The controller 36 monitors the displacement, velocity and acceleration of the stages 20 and 22 under the control of the respective actuators 32 and 34. The actuators 32 and 34 are designed to operate in a symmetric manner, where the stages 20 and 22 move at the same velocity in opposite directions. Hence, the pulling velocity ($v_p$) equals two times the speed of each stage.

The apparatus of FIG. 2 also includes a laser 42 that outputs optical laser energy toward a lens 44 that directs the optical energy into an input end of the optical fiber 28. The corresponding end of the optical fiber 30 can be left open, or it can be coupled to a third detector to measure back-reflected laser energy. A detector (D1) 38 monitors the output power of optical energy from the end of optical fiber 28, and a detector (D2) 40 monitors the output power of optical energy from the end of the optical fiber 30.

The apparatus of FIG. 2 further comprises a heat source 50 that applies heat to the first and second optical fibers at a selected intensity under the control of the controller 36. According to the disclosed embodiment, the heat source 50 is implemented as a flame source outputting a flame having a predetermined height and positioned at a predetermined distance relative to the optical fibers 28 and 30. The heat source 50 is controlled by an actuator 52 that controls the intensity of the applied heat by moving the heat source 50 away from the optical fibers along the z direction. The actuator 52 moves the heat source 50 at a flame velocity ($v_f$) controlled by the controller 36.

If desired, the flame source 50 may be substituted with an electric heat source or a laser heat source. In such a case, the heat intensity may be controlled either by moving the heat source away from the optical fibers, or by controlling the power supplied to the electric heat source or laser heat source. The intensity of the laser heat source may also be reduced by diffusing the laser beam.

The controller 36 monitors the overall coupling operation and controls the actuators to ensure that the desired coupling ratio is achieved in a controllable manner. Specifically, the controller 36 includes a control portion 42 and a plurality of registers 44 that store operational data related to the coupling process. For example, the controller 36 monitors pulling velocity ($v_p$), the flame velocity ($v_f$) identifying the speed of the heat source 50 along the z axis. The controller 36 also monitors the position of the heat source along the z direction as a function of the distance from the optical fibers ($d_f$), and the positions of the stage 20 ($x_{s1}$) and stage 22 ($x_{s2}$). As described below, the controller 36 also stores a selected acceleration rate ($a_p$) for the pulling velocity of the stages and the acceleration ($a_f$) of the flame velocity.

The controller 36 includes a control portion 42 that calculates the coupling ratio at selected wavelengths in response to the power generated by the detectors 38 and 40. For example, each detector outputs an output power identifying the detected optical energy output at an end of the corresponding optical fiber. The control portion 42 calculates the coupling ratio (CR) at the selected wavelengths, for example, L1=1310 nm, and L2=1550 nm. Alternately, the coupling ratio can be determined using a single one of the detectors. The control portion 42 also calculates and monitors the rate of change of the coupling ratios (d(CR)/dt) by determining the differential in the coupling ratio per unit time, for example, one second.

As described below, the controller 36 controls the rate of change in the coupling ratio (CR) by dynamically controlling the pulling velocity, and by controlling changes in the heat intensity, i.e., the position and speed of the heat source. The controller 36 gradually adjusts the pulling speed and the heat intensity to ensure that any changes in the pulling velocity and the heat intensity do not cause unwanted changes in the shape in the taper, which may otherwise cause a sudden change in the coupling ratio at the selected wavelengths.

The actuator 52 also is adapted to move the heat source 50 axially along the optical fibers 28 and 30 within a fusion region 51 having a length, for example, of 15 mm. This axial movement, known as dithering, distributes the heat along the fusion region 51. As recognized in the art, the actuator 52 may be modified to provide variations on the traveling path of the heat source 50 relative to the optical fibers to form more than one fusion area or modify the shape of the taper.

Figure 3:
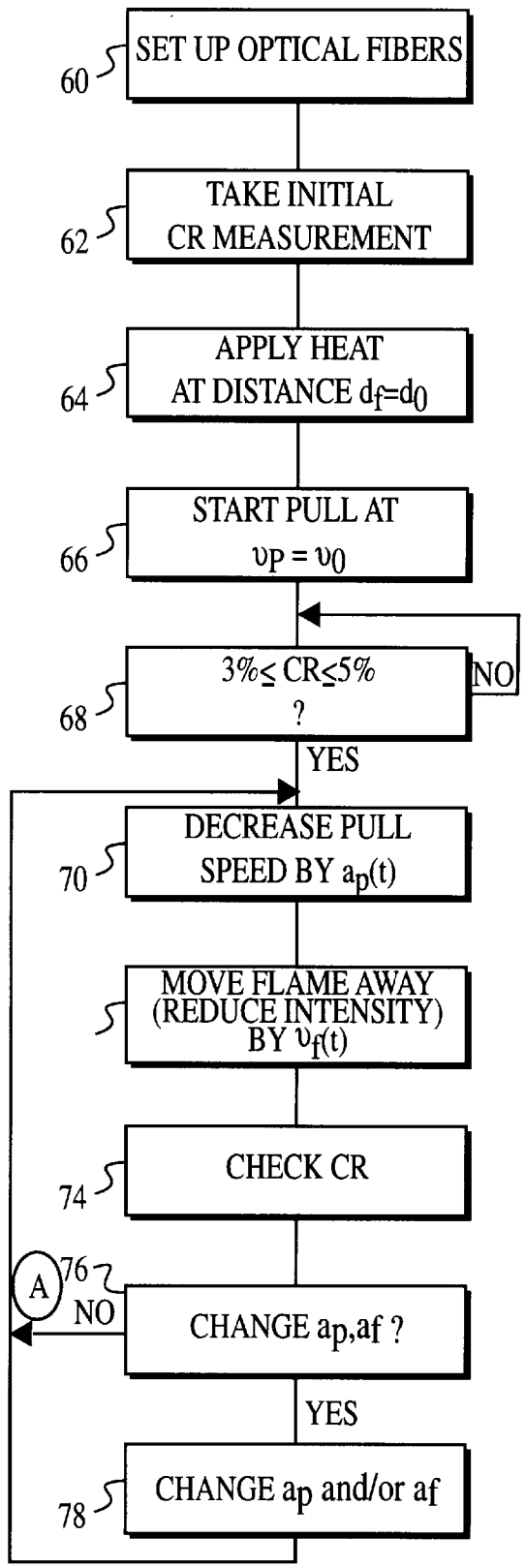
FIG. 3 is a flow diagram summarizing the method of forming a fiber optic coupler according to an embodiment of the present invention.

FIG. 3 is a flow diagram of the method of forming a fiber optic coupler according to an embodiment of the present invention. The method of FIG. 3 is under the control of the controller 36, enabling implementation of a fully automated system. The method begins in step 60 by initially setting up the apparatus of FIG. 2. The actuators 32 and 34 are preset such that the stages 20 and 22 are positioned closest to each other, i.e., the stage 20 is moved to the right-most position and the stage 22 is moved to the left-most position on the rails 24. The optical fibers 28 and 30 are then clamped within the mounts 26 of the stages 20 and 22 with sufficient initial tension to straighten the optical fibers 28 and 30, ensuring that the optical fibers contact each other at the fusion region 51.

After the optical fibers 28 and 30 have been mounted on the stages 20 and 22, the detectors 38 and 40 are coupled to the output ends of the optical fibers 28 and 30, respectively. The detectors are then calibrated using the laser 42 in step 62. In other words, the laser 42 outputs the optical laser energy at a known wavelength and a known input power to the optical fiber 28. Hence, the detector 38 should detect 100% of the output power from the optical fiber 28, and the detector 40 should detect 0% of the power at the output of the optical fiber 30. If the detector 40 outputs a reading suggesting a detected output power from the optical fiber 30, the controller 36 calibrates the detector 40 to 0%.

After the detectors 38 and 40 are calibrated to the laser 42 and the optical fibers 28 and 30 are positioned on the stages 20 and 22, the coupler formation process begins in step 64 by applying heat to the optical fibers 28 and 30. The heat is applied at a predetermined initial intensity by placing the flame generated by the heat source 50 at a predetermined distance ($d_f=d_0$) from the optical fibers, for example by placing the fibers at the tip of the flame.

Once the optical fibers have softened, the controller 36 starts pulling the optical fibers in step 66 at an initial velocity of $v_p=v_0$, where $v_0$ is equal to, for example, 5 mm per minute. The initial distance of the heat source 50 ($d_0$) and the initial pull speed ($v_0$) are maintained until the controller 36 detects in step 68 a substantial change in the detected coupling ratio of between 3% to 5%. The substantial change in the coupling ratio from 0 to at least 3% identifies the transition point at which the optical fibers begin to optically couple the transmitted laser energy.

Figure 1A:
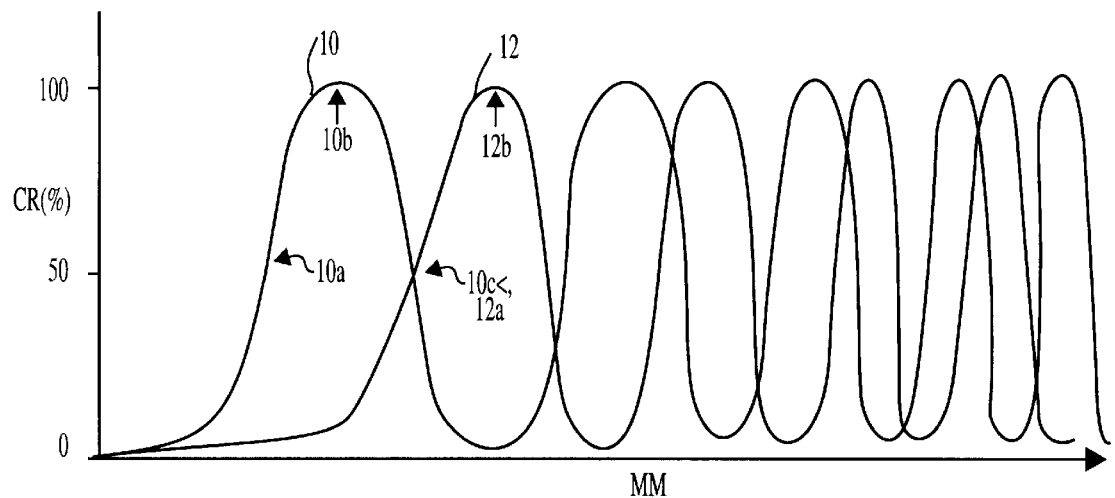
FIGS. 1A and 1B are diagrams illustrating the variation in coupling ratio during conventional coupler formation techniques.
Figure 1B:
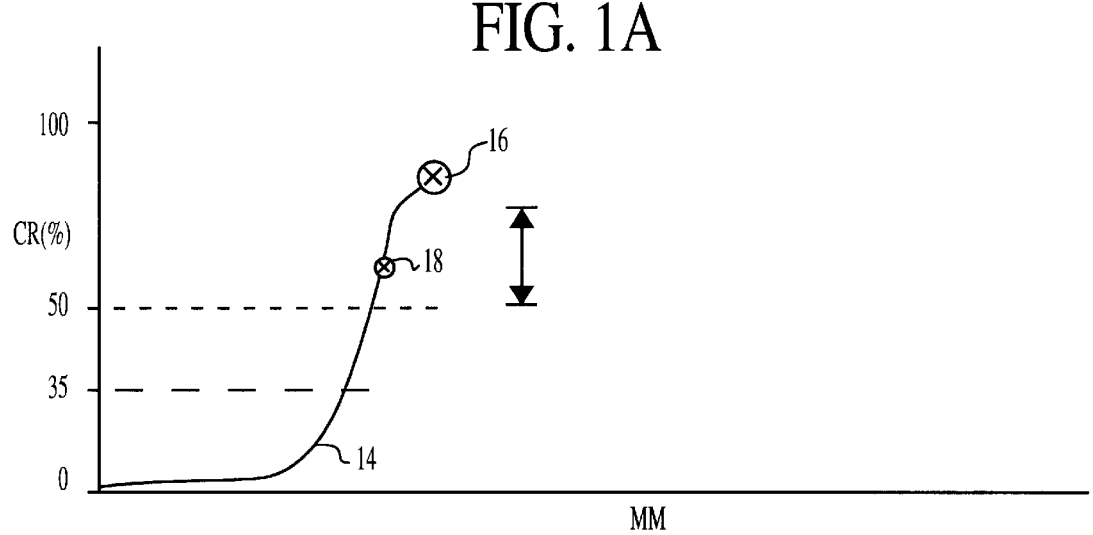

As described earlier, if the coupling ratio is allowed to increase by maintaining a constant pull velocity and a constant heat intensity, the coupling ratio will continue to increase in the manner shown in FIGS. 1A and 1B. It has been discovered that the rate of increase in the coupling ratio increases substantially after the coupling ratio reaches 10%. Hence, the control of the coupling ratio should begin before the coupling ratio reaches 10%.

The control of the coupling ratio begins in step 70 by decreasing the pull speed at a specified deceleration rate $a_p(t)$. The value of $a_p$ may be implemented as a percentage, for example, decreasing the pull speed by 4% per second. Alternately, the acceleration may be calculated as a continuous function, where the pulling velocity is calculated according to the equation $v_p(t)=v_0(e)^{t \ln x}$, where x is equal to 1 minus the percent decrease. Hence, if the pull speed is to be reduced by 4% per second, then x=0.96, and the equivalent pull equation would be:

$$v_p(t)=v_0(e)^{-0.04t}$$

Figure 4A:
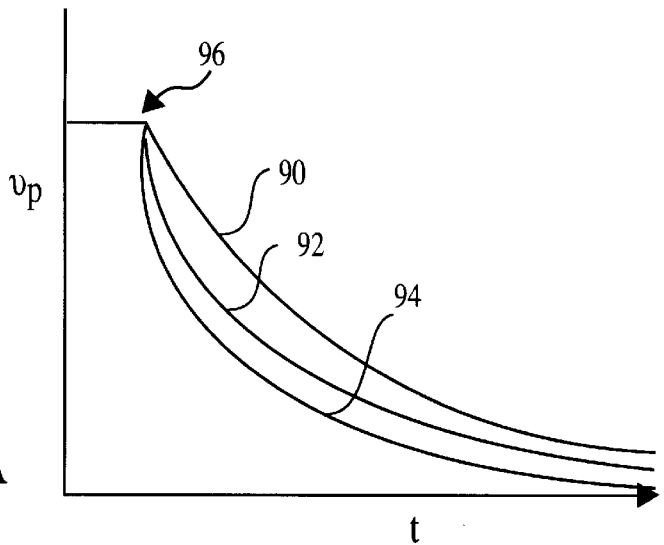
FIGS. 4A and 4B are diagrams illustrating pulling velocity and flame movement velocity according to the disclosed embodiment, respectively.

FIG. 4A is a diagram illustrating the reduction in pull speed with respect to the pulled distance. As shown in FIG. 4A, the pull speed is constant until the initial coupling point 96, at which point the controller 36 detects in step 68 a substantial change in the detected coupling ratio. The velocity curves 90, 92 and 94 correspond to acceleration rates of −2% per second, −4% per second, and −6% per second, respectively.

Figure 4B:
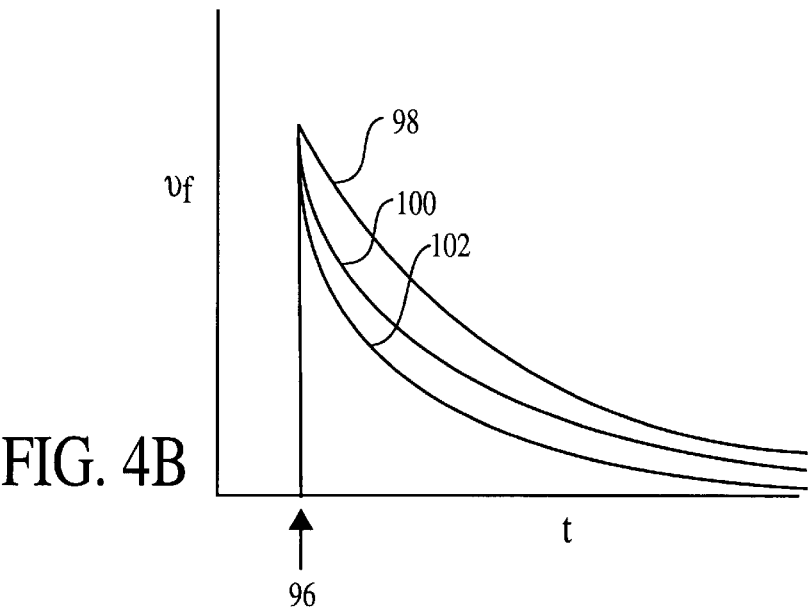

The coupling ratio is then controlled in step 72 by moving the heat source 50 away from the optical fibers at a speed of $v_f(t)$ shown in FIG. 4B.

Figure 5:
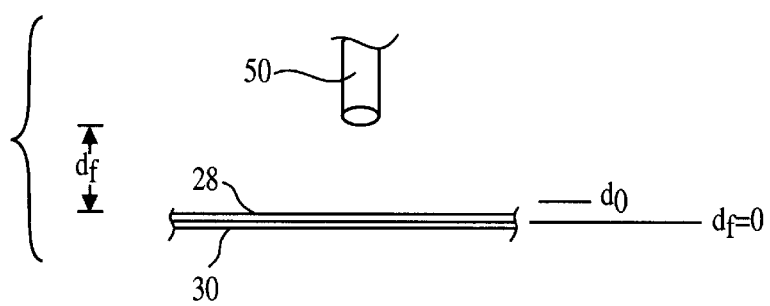
FIG. 5 is a diagram illustrating the orientation of the heat source of FIG. 2 relative to the optical fibers.

FIG. 5 is a diagram illustrating the relationship between the distance of the heating element 50 from the optical fibers 28 and 30. As shown in FIG. 5, the distance ($d_f$) is varied during the coupler formation process from the initial distance ($d_0$), where the initial distance $d_0$ has a value of approximately 0.5 mm. Hence, the heat source 50 is positioned such that the optical fibers 28 and 30 are positioned within the flame output by the heat source 50. As recognized in the art, the initial position of the heat source 50 is necessary to soften the optical fibers 28 and 30 sufficient to overcome the surface tension of the optical fibers. Once the optical fibers begin to physically fuse, the incident heat on the optical fibers is reduced by moving the heat source 50 away from the optical fibers. To prevent the movement of the heat source 50 from causing a change in the shape of the taper in the coupler, the pull speed is simultaneously reduced such that the ratio between the heat intensity and the pull speed is substantially constant. Hence, reducing the flame reduces the rate of change in the coupling ratio when the pull speed is reduced accordingly. Moreover, a reduction in heat intensity ensures the coupling ratio readings are not distorted. Hence, by reducing the heat intensity until the point where the optical fibers are soft enough to be pulled, the method of forming the coupler may be maintained over long periods of time, for example, up to one hour, by slowly reducing the pull speed of the stages 20 and 22. Thus, additional time is available for measurement and testing using the detectors 38 and 40.

Thus, the initial velocity of the heat source 50 before the initial coupling point 96 is zero in order to provide the maximum amount of heat to the optical fibers at the initial distance ($d_f=d_0$). The heat source 50 is then moved away in step 72 at a maximum initial speed, for example, 5 mm per minute. FIG. 4B illustrates the velocity curves 98, 100 and 102 for a speed reduction in the heat source of −1% per second, −2% per second, and −3% per second, respectively.

After the pull speed ($v_p$) and the heat intensity ($d_f$) have been changed in steps 70 and 72, respectively, the coupling ratio (CR) is checked at the selected wavelengths L1 and L2. If desired, the controller 36 may also calculate in step 74 the rate of change in the coupling ratio. After calculating the coupling ratio at the selected wavelengths and the rate of change in the coupling ratio, the controller 36 decides in step 76 whether the heat reduction rate ($a_f$) or the deceleration ($a_p$) of the pull speed needs to be changed in step 78. If no change in the deceleration rates is needed, the controller 36 returns to step 70 to selectively decrease the pull speed and the flame velocity for the next iteration. According to the disclosed embodiment, the decrease in steps 70 and 72 are implemented in one second iterations.

Figure 6A:
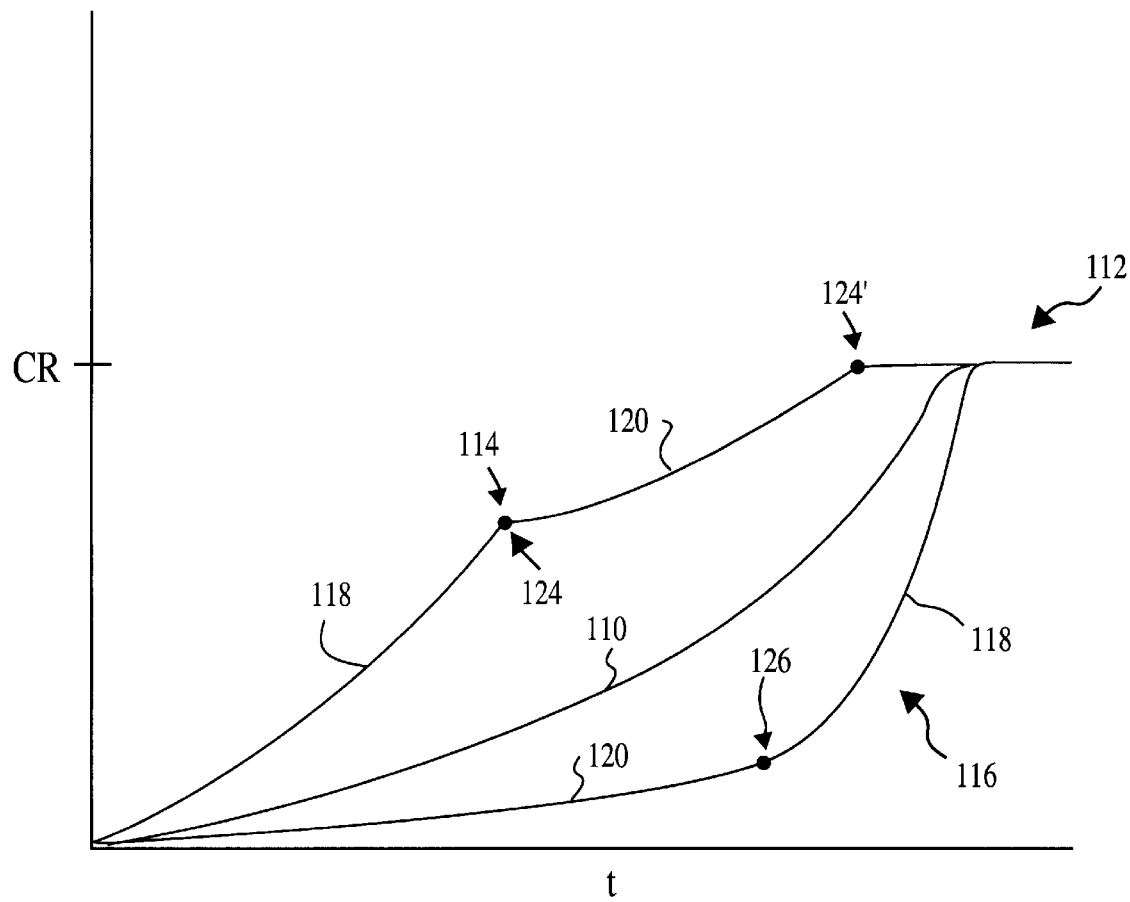
FIGS. 6A and 6B are diagrams illustrating changes in the coupling ratio during formation of the fiber optic coupler according to the disclosed embodiment.

FIG. 6A is a diagram illustrating the change in the coupling ratio according to the method of the present invention. As shown in FIG. 6A, a coupling ratio curve 110 increases steadily until reaching a desired level 112. As described above, the heat source 50 is preferably gradually reduced before reaching the desired coupling ratio 112 to ensure any sudden changes in the heat intensity do not distort the coupling ratio readings. Hence, the final incremental changes in the coupling ratio along the curve 110 is accomplished by maintaining the heat source 50 at a reduced intensity sufficient to enable the optical fibers to be pulled, steadily decreasing the pull speed ($v_p$) until the desired coupling ratio level 112 is reached, at which point the pull speed ($v_p$) is set to zero ($v_p=0$) and the heat source 50 is removed without causing a change in the coupling ratio.

The disclosed embodiment thus provides full control over the changes in the coupling ratio by dynamically adjusting the heat intensity and the pulling velocity. In addition, once the heat intensity has been reduced by a sufficient amount, i.e., once the flame has been moved far enough away, accurate measurements of the coupling ratio may be obtained, such that the pulling process may be halted precisely at the desired coupling ratio. Hence, the method of the present invention enables the heating and pulling process to be abruptly halted without adversely affecting the detected coupling ratio.

An additional feature of the disclosed embodiment is that the change in the coupling ratio may be selectively increased or decreased to accurately reach the desired coupling ratio 112. For example, FIG. 6A illustrates a coupling ratio curve 110 having a generally constant rate of increase. FIG. 6A also illustrates coupling ratio curves 114 and 116 having different rates of change in the coupling ratio. For example, assuming the coupling ratio curve 110 has a substantially constant increase of 0.5% per second, the coupling curve 114 has a fast rate portion 118, followed by a slow rate portion 120. For example, the fast rate portion 118 corresponds to an increase of 1.5% per second, and the slow rate portion corresponds to a rate of 0.25% per second. The change in the coupling ratio curve 114 occurs at point 124, at which point the acceleration rate of the pull speed ($a_p$) and/or the acceleration rate of the flame velocity ($a_f$) is changed in step 78 of FIG. 3. Conversely, the curve 116 illustrates a slow rate 120, followed by a fast rate 118 after the transition point 126.

Table 1 illustrates how the coupling ratio may be increased or decreased by changing the pull rate or the flame rate.

TABLE 1

| Example | Coupling Ratio | Pull Rate | Flame Rate |
|---------|----------------|-----------|------------|
| 1 | 1.5%/sec | −2%/sec | −2%/sec |
| 2 | 0.5%/sec | −4%/sec | −2%/sec |
| 3 | 0.25%/sec | −6%/sec | −2%/sec |
| 4 | 0.25%/sec | −4%/sec | −1%/sec |
| 5 | 0.5%/sec | −4%/sec | −2%/sec |
| 6 | 1.5%/sec | −4%/sec | −3%/sec |

As shown in Examples 1, 2 and 3 of Table 1, the rate of change in the coupling ratio may be increased by minimizing the decrease in the pull speed. Hence, if the rate of change in heat intensity is constant, the rate of change in the coupling ratio may be maximized by minimizing the decrease in the pull rate. Similarly, Examples 4–6 illustrate the pull rate decreasing at a constant rate, with the flame rate having various acceleration factors while in the coupling change region. As shown in Table 1, Example 4 has the slowest deceleration flame rate of −1% per second and provides the slowest increase in coupling ratio of 0.25% per second.

Hence, the rate of change in the coupling ratio can be controlled by selectively changing the acceleration rate ($a_p$) in the pulling velocity, also referred to as the pull rate, and/or changing the flame rate ($a_f$) in step 78. Thus, the rate of change in the coupling ratio may be reduced by maximizing the decrease in the pull rate while maintaining a constant rate of change in heat intensity.

Hence, the coupling ratio can be controlled as shown in FIG. 6A to provide maximum accuracy in obtaining the desired coupling ratio 112. As shown in curve 114, there may be more than one transition point in reaching the desired coupling ratio 112. For example, the curve 114 begins at change rate 118, and then transitions at point 124 to the lower change rate 120. As the coupling ratio approaches the desired coupling ratio 112, a second transition point 124' further reduces the rate of change in the coupling ratio. Although not desirable, the pull speed and flame intensity can be increased, if necessary.

Figure 6B:
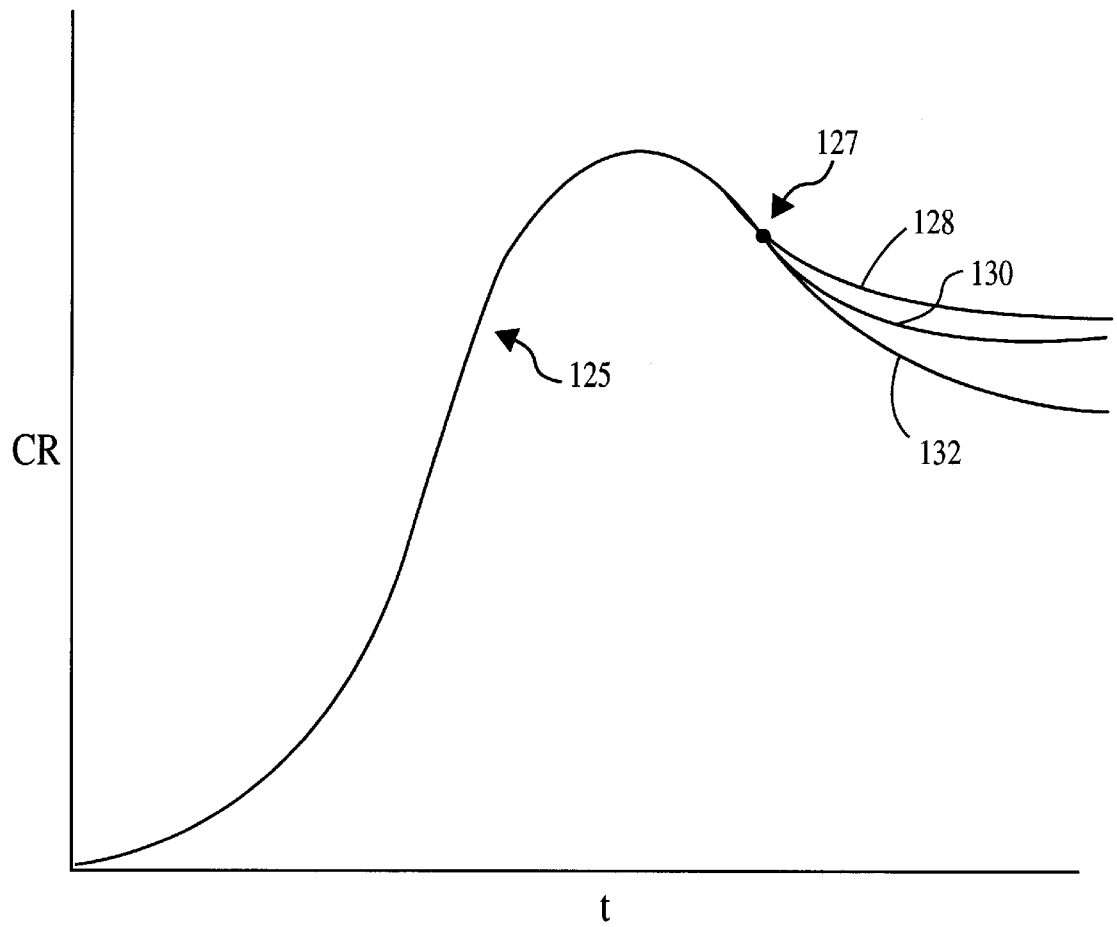

FIG. 6B illustrates different rate curves for a coupling ratio that has passed the maximum 100% coupling ratio. In this case, the change in the coupling ratio is modified at transition point 127 by selectively changing the acceleration rates in step 78 of FIG. 3A. Hence, assuming rate curve 130 corresponds to the velocity curves 92 and 100 of FIGS. 4A and 4B, respectively, the rate curve 128 may be obtained by using at least one of the velocity curves 94 and 102 of FIGS. 4A and 4B, respectively. Similarly, the rate curve 132 may be obtained by using at least one of the velocity curves 90 and 98, respectively.

Figure 7A:
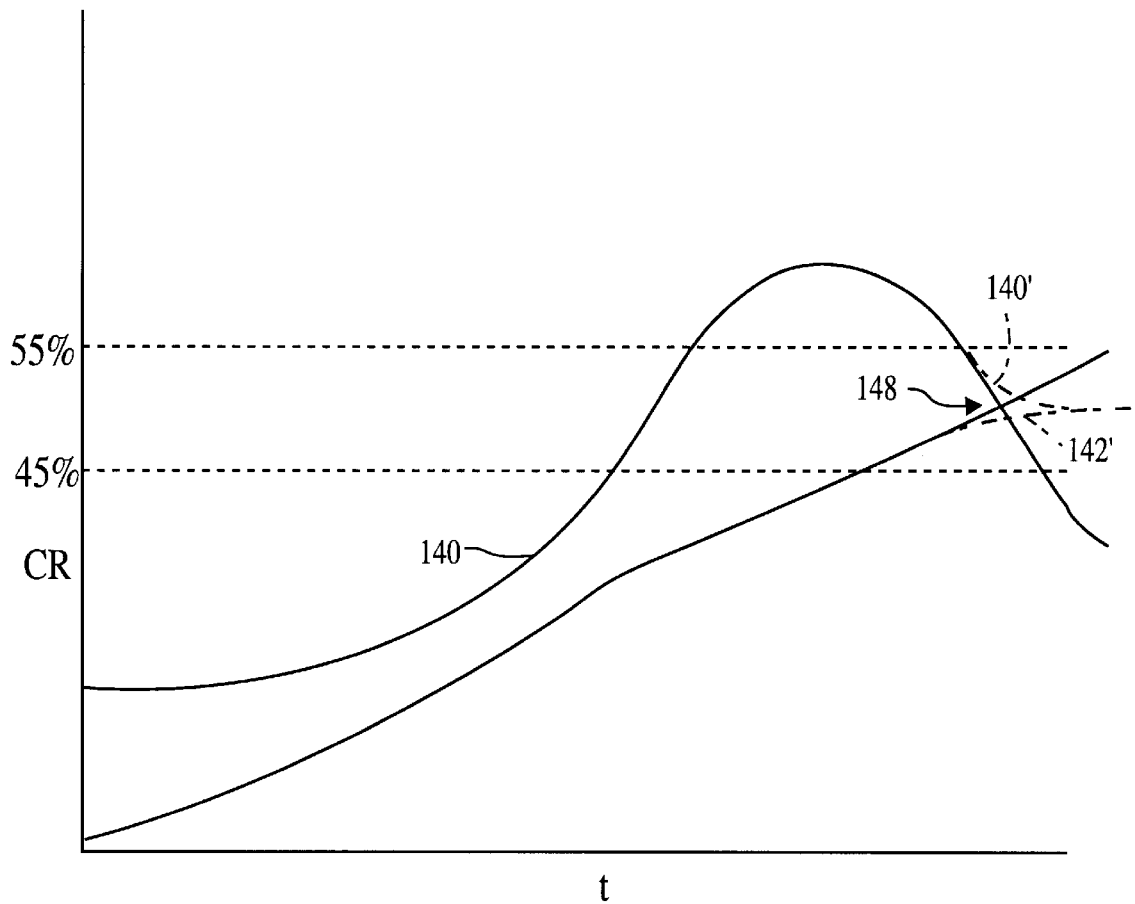
FIGS. 7A and 7B are diagrams illustrating the changes in the coupling ratio at different wavelengths during formation of a wideband coupler and wave division multiplexer, respectively, according to the disclosed embodiment.

FIG. 7A is a diagram illustrating the coupling ratio rate curves for two selected wavelengths in the formation of a wideband coupler according to the disclosed embodiment. The rate curve 140 represents the coupling ratio at 1550 nm, and the rate curve 142 represents the coupling ratio at 1310 nm. The rate curves 140 and 142 intersect at point 148. As shown in FIG. 7A, a wideband coupler having a coupling ratio between 45% and 55% may be obtained by gradually adjusting the acceleration in step 78 of FIG. 3A to reduce the change in the respective coupling ratios. Hence, by adjusting the acceleration rates in step 78, the respective coupling ratio curves are changed to curves 140' and 142' for 1550 nm and 1310 nm, respectively.

Figure 7B:
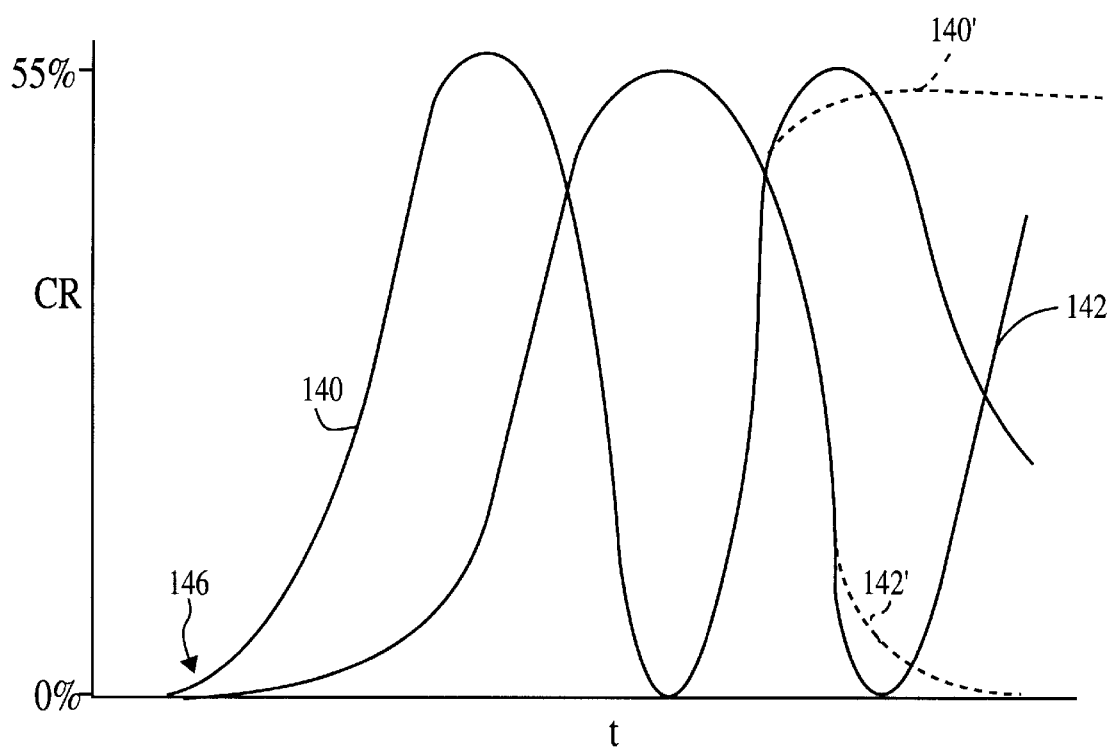

FIG. 7B is a diagram showing the coupling ratio curves for the two wavelengths 1550 nm and 1310 nm in forming a wave division multiplexer according to the disclosed embodiment. Hence, the control of the coupling ratio enables more precise control in the formation of wideband couplers and wave division multiplexers having precise coupling ratios.

According to the present invention, the incident heat on the optical fibers and the pull velocity of the optical fibers are reduced in response to a substantial change in the detected coupling ratio between the optical fibers. Dynamic adjustment of the heat intensity and the pull speed provides greater control over the shape of the taper and provides more accurate reading of the coupling ratio, resulting in formation of optical couplers having reliable coupling ratios.

In addition, the above embodiment can be implemented to form an optical attenuator, where an optical fiber is selectively tapered to provide a desired attenuation.

An additional feature of the disclosed embodiment is that no stress optic effects are induced. Hence, the coupler formed according to the disclosed embodiment does not have a high degree of polarization. Rather, the polarization of the coupler formed according to the disclosed embodiment may be as low, and possible lower than a conventional coupler. Moreover, experiments have found the coupler formed according to the disclosed embodiment to have a lower loss than conventional couplers, while at the same time providing greater structural strength. Hence, the arrangement for forming optical couplers according to the disclosed embodiment provides optical couplers having reliable coupling ratios and optimum optical properties. The disclosed methods are also applicable to single wavelength couplers, and multimode couplers made from multimode fibers.

As described above, the heat source 50 may be moved axially along the length of the optical fiber along a fusion region 51. This heating technique, known as dithering, may be modified by moving the heat source in circular or figure-eight patterns to form two or three fusion areas or change the taper shape, as desired.

In addition, it will be recognized that the heat source 50, disclosed as a flame burner, may be substituted with an electric heater capable of generating an operating temperature of 1573 K.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. An apparatus for fusing first and second optical fibers each having a first and second ends, the apparatus comprising:

at least one actuator capable of pulling at least one of the first and second ends of each of the first and second optical fibers at a pulling velocity;

at least one detector capable of detecting a coupling ratio between the first and second optical fibers in response to detected optical energy output at the at least one of the first and second ends of each of the first and second optical fibers;

a heat source capable of applying heat to the first and second optical fibers at a selected intensity; and a controller responsively connected to said at least one detector, and receiving the coupling ratio detected via said at least one detector and monitoring and determining a rate of change of the coupling ratio, said controller capable of separately controlling the pulling velocity and the heat intensity in accordance with the rate of change of the detected coupling ratio.

2. The apparatus of claim 1, wherein the controller is capable of changing said pulling velocity from an initial pulling velocity and said heat intensity from an initial heat intensity when a substantial change in the rate of change of the detected coupling ratio is detected.

3. The apparatus of claim 1, wherein the at least one detector is capable of calculating the coupling ratio including first and second optical wavelengths, and wherein the controller is capable of selectively adjusting the pulling velocity and the heat intensity in accordance with the calculated coupling ratio including the first and second optical wavelengths.

4. The apparatus of claim 1, further comprising a second actuator, responsive to said controller, capable of moving said heat source away from the first and second optical fibers at a velocity corresponding to said adjusting of the heat intensity.

5. The apparatus of claim 4, wherein the controller is capable of the moving of said heat source by said second actuator in response to detection of a substantial change in the detected coupling ratio.

6. The apparatus of claim 5, wherein said substantial change in the detected coupling ratio is within a range of between three and five percent.

7. An apparatus for fusing first and second optical fibers each having a first and second ends, the apparatus comprising:

at least one actuator capable of variably pulling at least one of the first and second ends of each of the first and second optical fibers at a pulling velocity;

at least one detector capable of detecting a coupling ratio between the first and second optical fibers in response to detected optical energy output at the at least one of the first and second ends of each of the first and second optical fibers;

a heat source capable of applying heat to the first and second optical fibers at a selected intensity; and a controller responsively connected to said at least one detector, and receiving the coupling ratio detected via said at least one detector and monitoring and determining a rate of change of the coupling ratio, said controller capable of separately dynamically controlling the pulling velocity and the heat intensity in accordance with the rate of change of the detected coupling ratio throughout the fusion of the first and second optical fibers.

8. An apparatus for fusing first and second optical fibers each having a first and second ends, the apparatus comprising:

at least one actuator capable of variably pulling at least one of the first and second ends of each of the first and second optical fibers at a pulling velocity under a variable tension;

at least one detector capable of detecting a coupling ratio between the first and second optical fibers in response to detected optical energy output at the at least one of the first and second ends of each of the first and second optical fibers;

a heat source capable of applying heat to the first and second optical fibers at a selected intensity; and a controller responsively connected to said at least one detector, and receiving the coupling ratio detected via said at least one detector and monitoring and determining a rate of change of the coupling ratio, said controller capable of separately dynamically controlling the pulling velocity and the heat intensity in accordance with the rate of change of the detected coupling ratio throughout the fusion of the first and second optical fibers.

9. An apparatus according to claim 8, wherein the change in coupling ratio comprises at least a substantial change in the coupling ratio.

10. An apparatus for fusing first and second optical fibers each having a first and second ends, the apparatus comprising:

at least one actuator capable of variably pulling at least one of the first and second ends of each of the first and second optical fibers at a pulling velocity under a variable tension;

at least one detector capable of detecting a coupling ratio between the first and second optical fibers in response to detected optical energy output at the at least one of the first and second ends of each of the first and second optical fibers;

a heat source capable of applying heat to the first and second optical fibers at a selected intensity; and a controller responsively connected to said at least one detector, and receiving the coupling ratio detected via said at least one detector and monitoring and determining a rate of change of the coupling ratio, said controller capable of separately dynamically controlling the pulling velocity and the heat intensity in accordance with the change of the detected coupling ratio throughout the fusion of the first and second optical fibers while the detected coupling ratio progresses from an initial coupling ratio substantially at the beginning of the fusing and a final coupling ratio substantially at the end of the fusing.

* * * * *